United States Patent
Jones et al.

[11] Patent Number: 6,109,631
[45] Date of Patent: Aug. 29, 2000

[54] INDEPENDENT SUSPENSION APPARATUS FOR A WHEELED VEHICLE

[75] Inventors: Robert Allen Jones, Canton; Manfred Carl Rumpel, Bloomfield Hills; Larry Skynar, Northville, all of Mich.

[73] Assignee: Ford Global Technologies, Inc., Dearborn, Mich.

[21] Appl. No.: 09/070,059

[22] Filed: Apr. 30, 1998

[51] Int. Cl.⁷ .................................................. B60G 7/00
[52] U.S. Cl. ......................... 280/124.134; 280/124.136; 280/124.138; 280/124.143
[58] Field of Search ....................... 280/124.11, 124.156, 280/124.125, 124.134, 124.135, 124.136, 124.138, 124.139, 124.143

[56] References Cited

U.S. PATENT DOCUMENTS

| | | |
|---|---|---|
| 2,757,017 | 7/1956 | Matthias et al. ................. 280/124.116 |
| 3,422,918 | 1/1969 | Musser, Jr. et al. . |
| 3,493,065 | 2/1970 | Burnham . |
| 4,902,033 | 2/1990 | Tonomura . |
| 4,925,207 | 5/1990 | Haraguchi . |
| 4,930,804 | 6/1990 | Tattermusch et al. . |
| 5,071,156 | 12/1991 | Kanai et al. ............................ 280/690 |
| 5,284,353 | 2/1994 | Shinji et al. ...................... 280/124.136 |
| 5,558,360 | 9/1996 | Lee ........................................... 280/675 |
| 5,845,926 | 12/1998 | Davis et al ...................... 280/124.109 |

FOREIGN PATENT DOCUMENTS

| | | |
|---|---|---|
| 0 339 479 | 4/1989 | European Pat. Off. . |
| 20 35 307 | 7/1970 | Germany . |
| 63-270205 | 11/1988 | Japan . |
| 2-24210 | 1/1990 | Japan . |

*Primary Examiner*—Brian L. Johnson
*Assistant Examiner*—Faye M. Fleming
*Attorney, Agent, or Firm*—Gregory P. Brown

[57] ABSTRACT

A rear suspension for use in a motor vehicle that allows improved package space for additional seating capacity. The suspension includes upper and lower control arms (32, 34), each having first and second ends (40, 42, 50, 52) respectively, being pivotally attached to a vehicle structure (10). Each of the control arms also includes an outer end (44, 54) for attachment to a wheel support member (22). A toe link (36) is provided for controlling toe change during dynamic loading of the suspension. The first and second upper ends (40, 42) of the upper control arm (32) are arranged so as to allow the load floor to extend rearward in the vehicle sufficient to package a third row passenger seat capable of providing excellent passenger comfort.

17 Claims, 5 Drawing Sheets

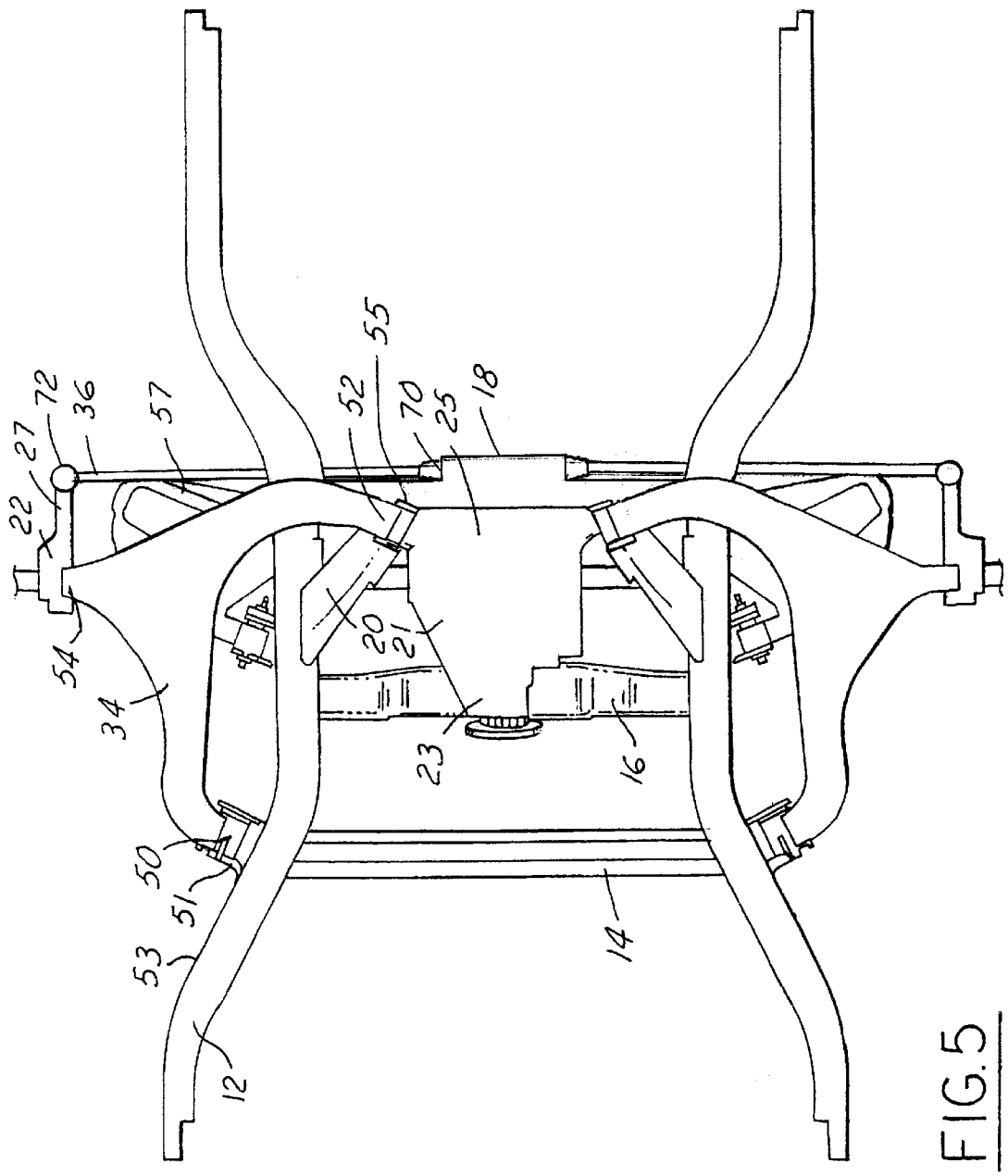

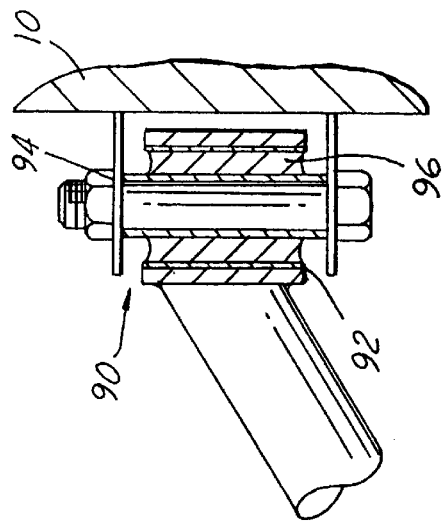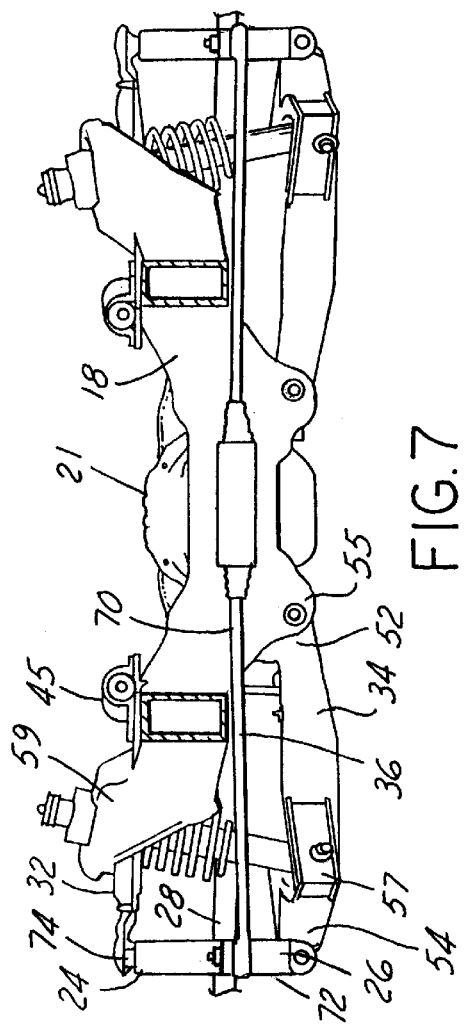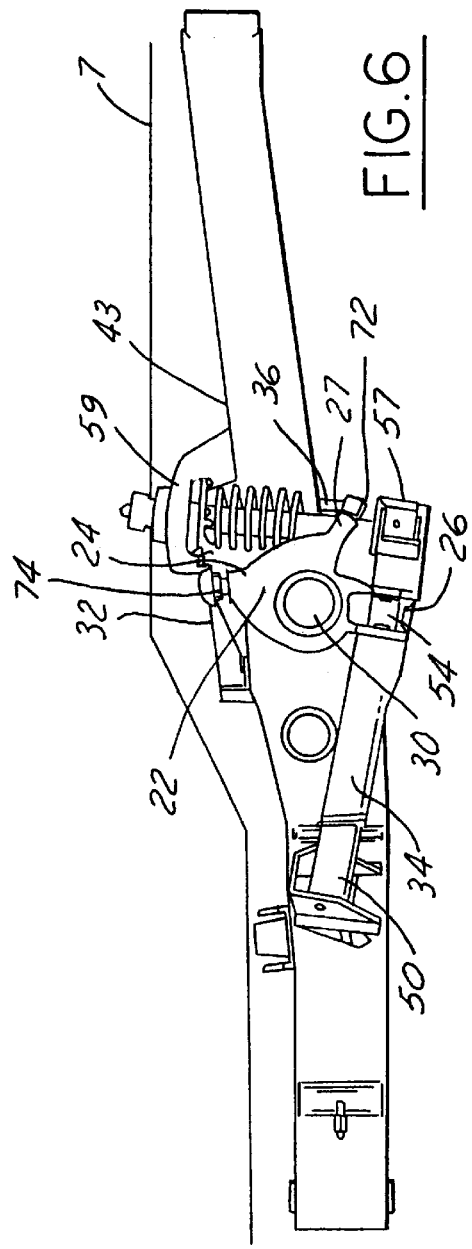

INDEPENDENT SUSPENSION APPARATUS FOR A WHEELED VEHICLE

BACKGROUND OF THE INVENTION

1. Field of the Invention

This invention relates generally to an independent suspension for use on a motor vehicle. More particularly, the present invention relates to an independent suspension having suspension members arranged to provide maximum load floor package space for incorporating additional seating capacity.

2. Disclosure Information

In the conventional motor vehicle, as shown in FIG. 1, a pair of side frame members 1 are included having kickup portions 3 where the frame members sharply curve upward to provide clearance for the articulating suspension and axle 5. A load floor 7 of a body of the motor vehicle must be higher than this kickup portion 3 of the frame. As a result, the interior package space is constrained significantly by the height of the kickup portion 3 of the frame side members 1. This becomes particularly important where it is desirable to incorporate a third row seat 9 above the load floor. Satisfactory packaging of this third seat includes providing sufficient foot well space as well as sufficient headroom, indicated by line 1a. With this kickup frame design and solid axle suspension, the occupant's legs are raised to a position that is not comfortable over a lengthy ride.

It would be desirable to overcome the aforenoted difficulties with rear suspension systems by providing a vehicle suspension that allows desirable axle, suspension and wheel articulation while affording interior package space for a third row seat that has previously not been available in vehicles of this size.

SUMMARY OF THE INVENTION

According to the present invention, a rear suspension apparatus for a motor vehicle is provided for increasing the available package space for additional seating capacity. The rear suspension apparatus includes a vehicle structure having a pair of frame members extending generally longitudinally within the motor vehicle and a wheel support member for rotatably supporting a wheel and tire assembly.

The suspension also includes an upper control arm having first and second upper ends pivotally connected to the vehicle structure and an outer upper end pivotally connected to an upper end of the wheel support member. A lower control arm is included having first and second lower ends pivotally connected to a vehicle structure and an outer lower end pivotally connected to a lower end of the wheel support member.

The upper control arm is arranged such that the first upper end is disposed slightly rearward of the first lower end and forward of the second lower end and the second upper end of the upper control arm is disposed rearward of the second lower end such that the first upper end reacts primarily lateral loads and the second upper end reacts primarily longitudinal loads.

Advantageously, this rear suspension apparatus allows the load floor forward of the first upper end to extend further rearward in the vehicle than previously attained.

BRIEF DESCRIPTION OF THE DRAWINGS

FIG. 5 is a bottom view of a rear suspension apparatus according to the present invention.

FIG. 6 is an elevational view of a rear suspension apparatus according to the present invention.

FIG. 7 is a rear view of a rear suspension apparatus according to the present invention.

FIG. 8 is a partial sectional view of a conventional elastomeric joint for use in a rear suspension apparatus according to the present invention.

DETAILED DESCRIPTION OF THE PREFERRED EMBODIMENT

Figure 3:
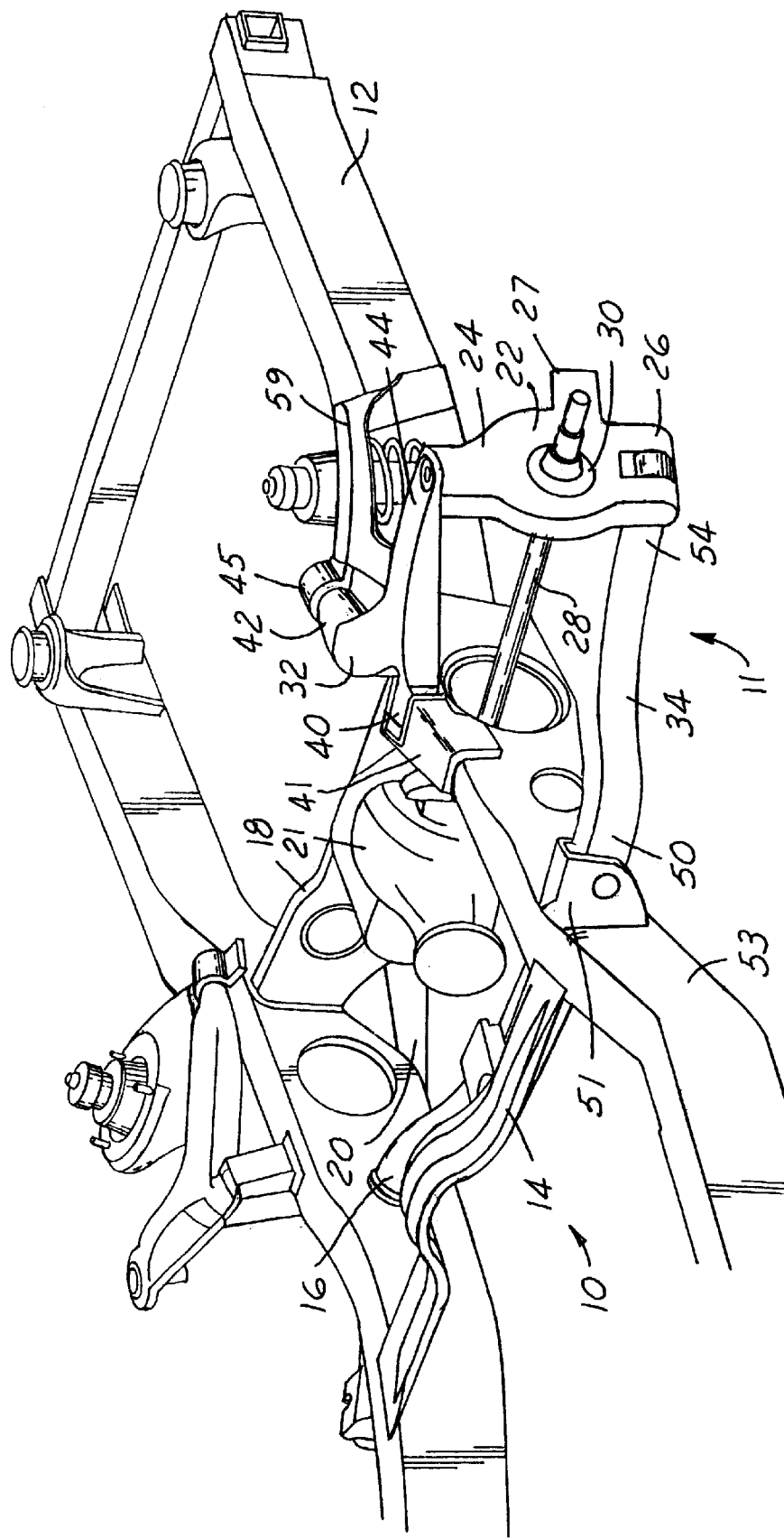
FIG. 3 is a perspective view of a rear suspension apparatus located in a motor vehicle structure in accordance with the present invention.
Figure 4:
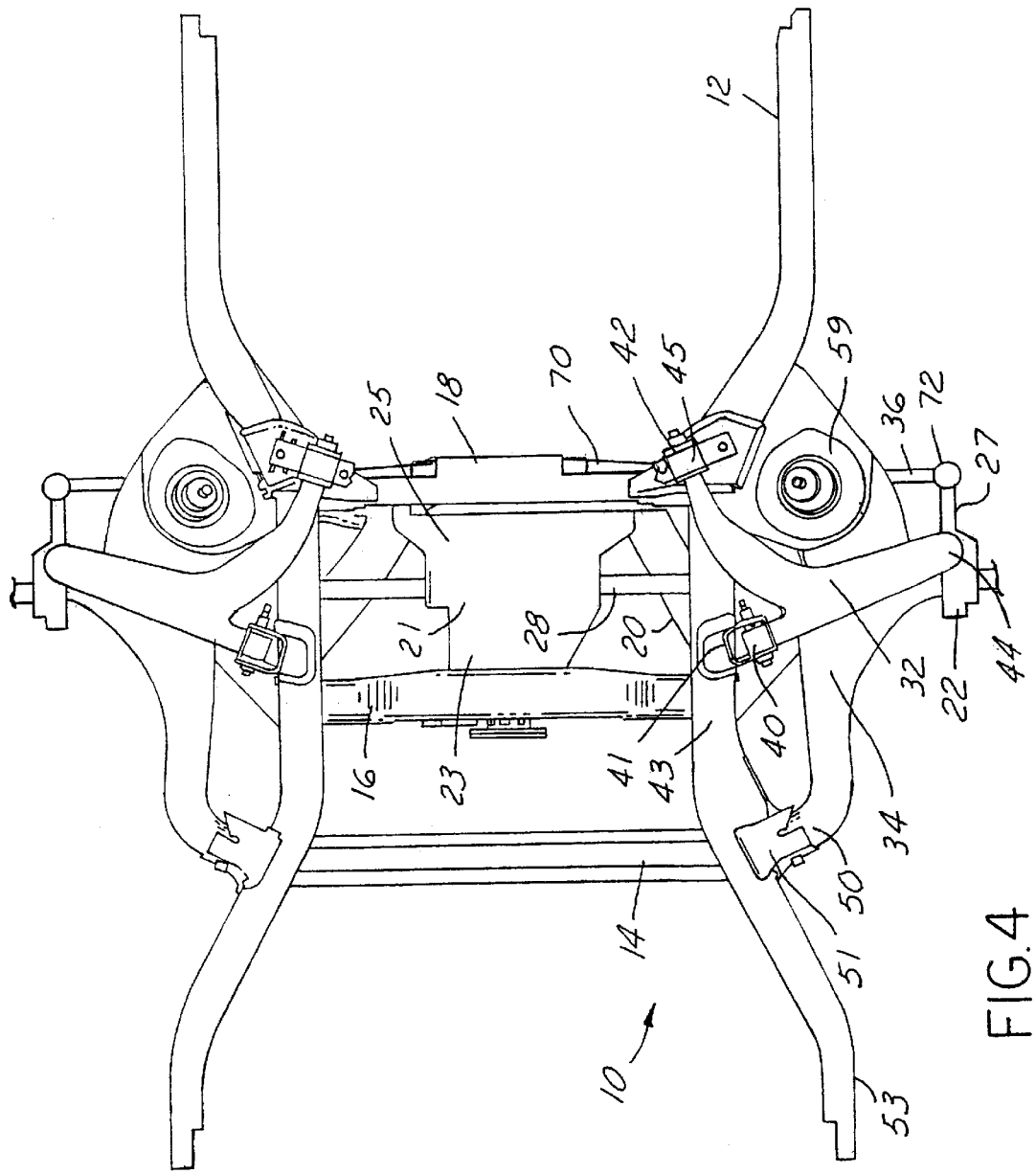
FIG. 4 is a plan view of a rear suspension apparatus according to the present invention.

Referring now to FIGS. 3 and 4, a suspension 11 for a motor vehicle is shown attached to a vehicle structure 10. The term "structure" when used in this specification and claims will be understood to refer to either a conventional vehicle chassis having body on frame construction or a conventional unitary chassis and body construction, which may or may not incorporate subframes therein. In any event, the structure makes up a part of the sprung mass of the vehicle and provides a foundation for suspension attachment.

The vehicle structure 10 includes a pair of frame members 12 extending generally longitudinally within the motor vehicle. In the preferred embodiment, the frame members 12 are closed box sections for increased torsional stiffness, however, they could also be constructed from open C-channels, hydroformed or extruded closed box sections. A first cross member 14 extends between and interconnects the pair of frame members 12.

The vehicle structure also includes a second cross member 16 rearward of the first cross member 14 and extends between and interconnects the pair of frame members 12. Additionally, a third cross member 18 is located rearward of the second cross member 16 and also extends between and interconnects the pair of frame members 12. A pair of triangulating members 20 may be positioned between the third cross member 18 and the frame members 12 to resist match boxing of the frame members. The triangulating members 20 are aligned substantially diagonally to the longitudinal axis of the motor vehicle. A differential unit 21 having a front end 23 supported on the second cross member 16 and a rear end 25 supported on the third cross member 18 and right and left axles 28 extending therefrom transverse to the longitudinal axis The various structural members may be manufactured as simple stampings, open C-channels or where additional loading requirements demand stronger members, they may be made as closed sections constructed by welding C-channels, hydroforming or extrusion.

Referring now to FIGS. 3–7, the suspension comprises a wheel support member 22 having upper and lower ends 24, 26 and a rearward portion 27. Axles 28, which may be driven as illustrated, or imaginary on freewheeling axles, extends through a center 30 of the wheel support member 22. Upper and lower control arms 32, 34 and a toe link 36 connect the wheel support member 22 to the vehicle structure 10. It should be noted that only the left of the suspension will be described herein for purposes of simplicity, it being understood that the right side is simply the symmetric opposite of the left.

The lower control arm 34 is generally of the A-shaped type, including first and second lower ends 50, 52 for pivotally attaching to the vehicle structure 10. The lower control arm 34 also includes an outer lower end 54 for pivotally attaching to the lower end 26 of the wheel support member 22. The first lower end 50 attaches to a first lower bracket 51 mounted on an outer side 53 of the frame member 12. To provide increased stability for this mount, it is desirable to locate the first lower bracket 51 on the frame member at a point adjacent to the first cross member 14. The second lower end 52 attaches to the a second lower bracket 55, which, in the preferred embodiment, is mounted to the triangulating member 20 between the third cross member 18 and the frame member 12.

It should be recognized by those skilled in the art that the bracket 55 could be attached to either the inner side of the frame member 12, or the third cross member 18. Additionally, as can be seen in FIG. 7, the third cross member 18 is positioned at a height substantially equal to a height of the axle shafts, which is common with the wheel center, when viewed from behind. This helps resist torsional deformation of the frame members 12 under dynamic loading imparted on the frame members 12 by the bracket 55 and an upper shock and spring attachment tower 59.

The lower control arm 32 also includes an attachment point 57 for the attachment of a shock absorber, strut or coil over shock absorber arrangement. The first and second lower ends 50, 52 and the attachment point 57 are arranged in a predetermined relationship so as to provide several operational advantages. Specifically, the attachment point 57 is positioned between the second lower end 52 and the outer lower end 54 such that a ratio of length between the attachment point 57 and the second lower end 52 and the outer lower end 54 and the second lower end 52 is greater than 0.5. This allows the shock absorber to have a longer stroke over which to dissipate energy in order to control the articulation of the suspension.

Additionally, a line (not shown) drawn through the attachment point 57 and the first lower end 50 substantially lies in a vertical plane parallel to the vehicles longitudinal axis. Also, a line (not shown) drawn through the second lower end 52 and the outer lower end 54 substantially lies in a vertical plane transverse to the longitudinal axis of the vehicle. This orientation provides a beneficial decoupling of longitudinal and lateral forces transmitted to the vehicle structure, which simplifies the tuning of bushings, as illustrated in FIG. 8, described below, used to attach the upper and lower control arms 32, 34 to the vehicle structure.

The upper control arm 32 is also generally of the "A-shaped" type, including first and second upper ends 40, 42 for pivotally attaching to the vehicle structure 10. The upper control arm 32 also includes an outer upper end 44 for pivotally attaching to the upper end 24 of the wheel support member 22. The first upper end 40 attaches to a first upper bracket 41 mounted on a top surface 43 of the frame member 12. To provide increased stability for this mount, it is desirable to locate the first upper bracket 41 on the frame member at a point adjacent to the second cross member 16. The second upper end 42 utilizes a bayonet style mount retained by a second upper bracket 45 that is attached to the top surface 43 of the frame member either adjacent to or partially on the third cross member 18. The bayonet style mount is preferred as it provides greater axial compliance and displacement than a conventional bushing mounted as shown at the first upper end 40.

In the plan view, the first upper end 40 is located rearward of the first lower end 50 and forward of the second lower end 52 very close to the axle centerline. The second upper end 42 is disposed rearward of the second lower end 52. Another feature of the upper control arm 32 includes a relationship between the distances between the first and second upper ends 40, 42 and the second and outer upper ends 42, 44. Specifically, the second upper end 42 is disposed rearward of the first upper end 40 sufficiently distant to ensure a ratio of length between the outer upper end 44 and the first upper end 40 and the second upper end 42 and the outer upper end 44 falls within the range of 0.8 and 1.2. Together, the location of the first and second ends 40, 42 and the length ratios helps ensure that longitudinal loads will primarily be reacted by the second upper end 42 and lateral loads will primarily be reacted by the first upper end 40. As with the lower control arm 34, this beneficially simplifies the tuning of elastomeric bushings used to attach the upper control arm 32 to the vehicle structure 10.

As with other suspensions using A-shape control arms, both the upper and lower control arms 22, 24 are positioned to rotate about axes lying in predetermined planes, resulting in desirable suspension operating characteristics under acceleration and braking.

The toe link 36 is preferably adjustable in length and includes an inner toe end 70 attached to the third cross member 18 and an outer toe end 72 attached to the rearward portion 27 of the wheel support member 12. As illustrated, the toe link 36 is located such that it extends slightly forward from the inner toe end 70 toward the outer toe end 72.

In the present invention a ball joint 74 is preferred for providing the connection of the outer upper 44 of the upper control arm 32 to the upper end 24 of the wheel support member 22. A conventional ball joint provides three degrees of rotational freedom and no translational degrees of freedom. Therefore, it is considered rigid from a displacement standpoint and relatively unconstrained from a rotational standpoint.

FIG. 8 illustrates a conventional elastomeric bushing 90 commonly used for providing isolation and control of the inboard attachments of the upper and lower control arms 32, 34 to the vehicle structure 10, except as noted above. The elastomeric bushing 90 includes an outer sleeve 92 having an outer diameter permitting a press fit relationship with a bore formed in the end of a control arm. An inner sleeve 94 is coaxially disposed within the outer sleeve 92 forming an annular region therebetween that is filled with an elastomeric material 96 having a predetermined durometer. A threaded fastener passes through a bore in the inner sleeve for attachment with the vehicle structure 10. This type of joint permits three degrees of rotational freedom as well three degrees of translational freedom and is very effective for providing vibration isolation. In the present invention, elastomeric bushings 90 provide connection at the first upper end 40 and the first and second lower ends 50, 52.

Figure 1:
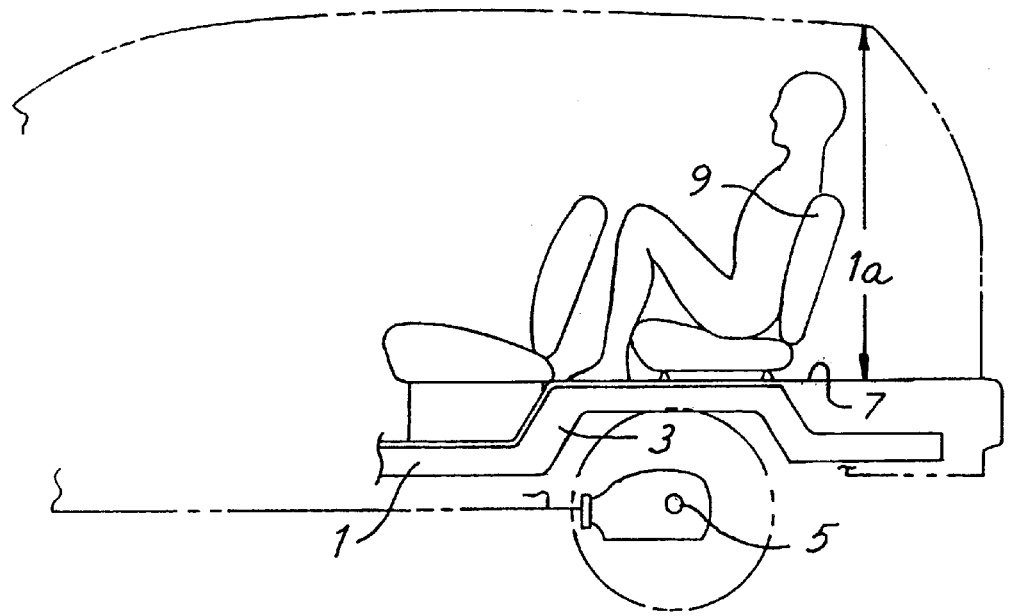
FIG. 1 is a side elevational view of a prior art motor vehicle and rear structure configuration.
Figure 2:
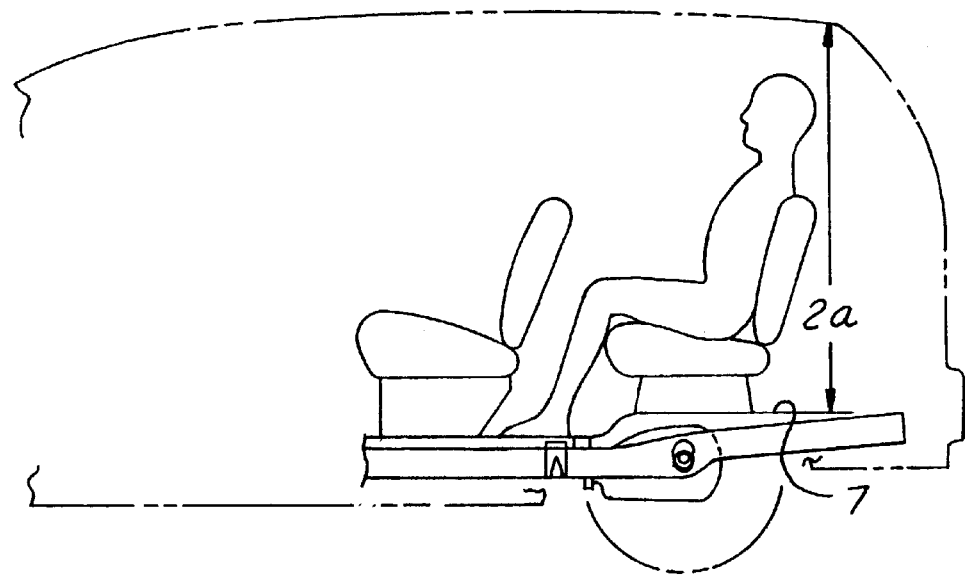
FIG. 2 is a side elevational view of a motor vehicle having a rear structure constructed in accordance with the present invention.

The present invention permits the efficient packaging of the members of a rear suspension allowing desirable articulation of the axle and a wheel while allowing a lower load floor 7 as illustrated in FIGS. 2 and 6 than has otherwise been attained by previous rear suspensions. The lower load floor, in turn, allows a third row rear seat 9 to be packaged with increased foot well space as well as increased headroom, indicated by line 2a.

The foregoing description presents one embodiment of the present invention. Details of construction have been shown and described for purposes of illustration rather than limitation. Modifications and alterations of the invention will no doubt occur to those skilled in the art that will come within the scope and spirit of the following claims.

What is claimed is:

1. A rear suspension apparatus for a motor vehicle comprising:
    a vehicle structure having a pair of frame members extending generally longitudinally within the motor vehicle;
    a wheel support member for rotatably supporting a wheel and tire assembly, said wheel support member having upper and lower ends;
    an upper control arm having first and second upper ends pivotally connected to said vehicle structure and an outer upper end pivotally connected to said upper end of said wheel support member;
    a lower control arm having first and second lower ends pivotally connected to said vehicle structure and an outer lower end pivotally connected to said lower end of said wheel support member; and
    an attachment point positioned on said lower control arm between said second lower end and said outer lower end, said second lower end being disposed on an inboard side of said frame member thereby providing a ratio of length between said attachment point and said second lower end and said outer lower end and said second lower end greater than 0.5;
    wherein said first upper end of said upper control arm is disposed slightly rearward of said first lower end and forward of said second lower end and said second upper end of said upper control arm is disposed rearward of said second lower end such that said first upper end reacts primarily lateral loads and said second upper end reacts primarily longitudinal loads.

2. A rear suspension apparatus according to claim 1, further comprising:
    a first cross member extending between and interconnecting said pair of frame members;
    a second cross member rearward of said first cross member and extending between and interconnecting said pair of frame members; and
    a third cross member rearward of said second cross member and extending between and interconnecting said pair of frame members;
    wherein said first lower end of said lower control arm attaches to an outboard side of said frame member adjacent to said first cross member.

3. A rear suspension apparatus according to claim 2, further comprising a differential unit having a front end supported from said second cross member and a rear end supported from said third cross member, wherein said second lower end of said lower control arm attaches to said third cross member adjacent to an inboard side of said frame member.

4. A rear suspension apparatus according to claim 2, further comprising:
    a pair of triangulating members extending from said pair of frame members and connecting to said third cross member; and
    a differential unit having a front end supported from said second cross member and a rear end supported from said third cross member;
    wherein said second lower end of said lower control arm attaches to said triangulating members adjacent to said third cross member.

5. A rear suspension apparatus according to claim 2, further comprising a differential unit having a front end supported from said second cross member and a rear end supported from said third cross member, wherein said first upper end of said upper control arm attaches to said frame member at a point adjacent to said second cross member and said second upper end of said upper control arm attaches to said frame member at a point adjacent to said third cross member.

6. A rear suspension apparatus according to claim 1, wherein said upper control arm is further characterized by a ratio of length between said outer upper end and said first upper end and said first upper end and said second upper end between 0.9 and 1.1.

7. A rear suspension apparatus for a motor vehicle comprising:
    a vehicle structure having a pair of frame members extending generally longitudinally within the motor vehicle;
    a wheel support member for rotatably supporting a wheel and tire assembly, said wheel support member having upper and lower ends;
    an upper control arm having first and second upper ends pivotally connected to said vehicle structure and an outer upper end pivotally connected to said upper end of said wheel support member; and
    a lower control arm having first and second lower ends pivotally connected to said vehicle structure and an outer lower end pivotally connected to said lower end of said wheel support member;
    wherein said upper control arm is oriented such that said outer upper end and said first upper end of said upper control arm lie on a line that is substantially transverse to a longitudinal axis of the vehicle and said first and second upper ends lie on a line that is substantially parallel to said longitudinal axis of the motor vehicle such that said first upper end reacts primarily lateral loads and said second upper end reacts primarily longitudinal loads, and wherein said upper control arm is further characterized by a ratio of length between said outer upper end and said first upper end and said first upper end and said second upper end between 0.9 and 1.1.

8. A rear suspension apparatus according to claim 7, further comprising an attachment point positioned on said lower control arm between said second lower end and said outer lower end, said second lower end being disposed on an inboard side of said frame member thereby providing a ratio of length between said attachment point and said second lower end and said outer lower end and said second lower end greater than 0.5.

9. A rear suspension apparatus according to claim 7, further comprising:
    a first cross member extending between and interconnecting said pair of frame members;
    a second cross member rearward of said first cross member and extending between and interconnecting said pair of frame members; and
    a third cross member rearward of said second cross member and extending between and interconnecting said pair of frame members;
    wherein said first lower end of said lower control arm attaches to an outboard side of said frame member adjacent to said first cross member.

10. A rear suspension apparatus according to claim 9, further comprising a differential unit having a front end supported from said second cross member and a rear end supported from said third cross member, wherein said second lower end of said lower control arm attaches to said third cross member adjacent to an inboard side of said frame member.

11. A rear suspension apparatus according to claim 9, further comprising:
   a pair of triangulating members extending from said pair of frame members and connecting to said third cross member; and
   a differential unit having a front end supported from said second cross member and a rear end supported from said third cross member;
   wherein said second lower end of said lower control arm attaches to said triangulating members adjacent to said third cross member.

12. A rear suspension apparatus according to claim 9, further comprising a differential unit having a front end supported from said second cross member and a rear end supported from said third cross member, wherein said first upper end of said upper control arm attaches to said frame member at a point adjacent to said second cross member and said second upper end of said upper control arm attaches to said frame member at a point adjacent to said third cross member.

13. A rear suspension apparatus for a motor vehicle having a longitudinal axis, said rear suspension apparatus comprising:
   a vehicle structure comprising:
      a pair of frame members extending generally longitudinally within the motor vehicle;
      a second cross member extending between and interconnecting said pair of frame members;
      a third cross member rearward of said second cross member and extending between and interconnecting said pair of frame members;
   a differential unit having a front end supported from said second cross member and a rear end supported from said third cross member and right and left axle shafts extending therefrom transverse to the longitudinal axis;
   a wheel support member having for rotatably supporting a wheel and tire assembly, said wheel support member having upper and lower ends;
   an upper control arm having first and second upper ends pivotally connected to said vehicle structure and an outer upper end connected to said upper end of said wheel support member; and
   a lower control arm having a first lower end pivotally connected to said vehicle structure and a second lower end pivotally connected to said third cross member and an outer lower end connected to said lower end of said wheel support member;
   wherein said first upper end of said upper control arm is disposed forward of said axle when viewed from above and said second upper end of said upper control arm being disposed rearward of said axle when viewed from above and said third cross member being disposed at a height substantially equal to a height of said right and left axle shafts as viewed from behind at a predetermined design loading.

14. A rear suspension apparatus according to claim 13, further comprising an attachment point positioned on said lower control arm between said second lower end and said outer lower end, said second lower end being disposed on an inboard side of said frame member thereby providing a ratio of length between said attachment point and said second lower end and said outer lower end and said second lower end greater than 0.5.

15. A rear suspension apparatus according to claim 13, further comprising a first cross member extending between and interconnecting said pair of frame members, wherein said first lower end of said lower control arm attaches to an outboard side of said frame member adjacent to said first cross member.

16. A rear suspension apparatus according to claim 13, further comprising a pair of triangulating members extending from said pair of frame members and connecting to said third cross member, wherein said second lower end of said lower control arm attaches to said triangulating members adjacent to said third cross member.

17. A rear suspension apparatus according to claim 13, wherein said upper control arm is further characterized by a ratio of length between said outer upper end and said first upper end and said first upper end and said second upper end between 0.9 and 1.1.

* * * * *